Dec. 17, 1957     O. BECK ET AL     2,816,973
FLOAT OPERATED SWITCH
Filed April 1, 1954
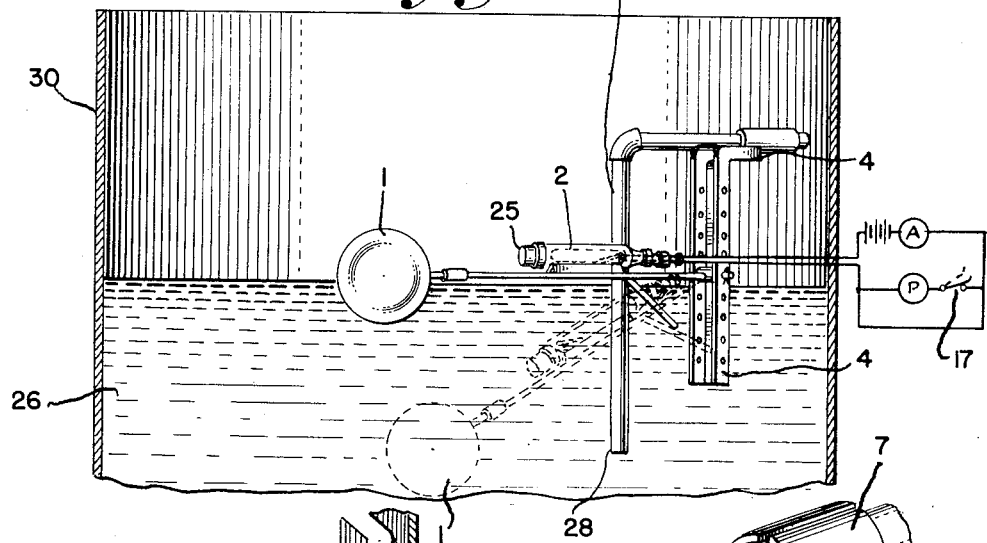
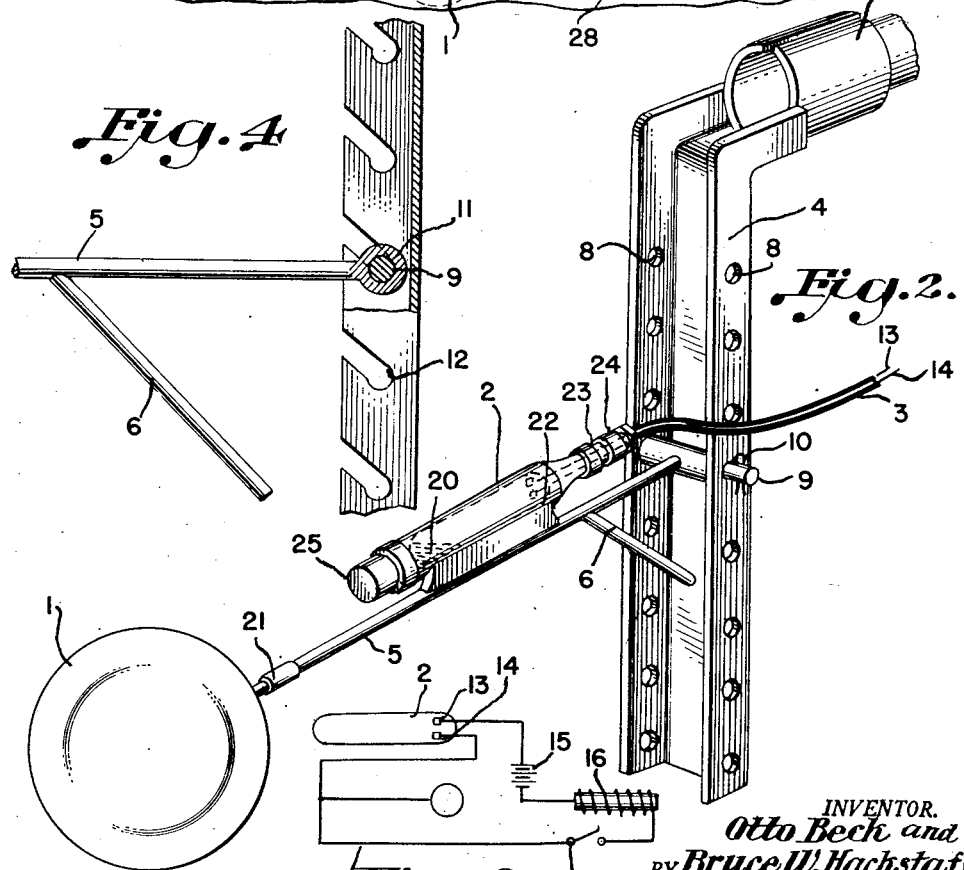
INVENTOR.
*Otto Beck* and
BY *Bruce W. Hackstaff.*
*Wenderoth, Lind and Ponack*
ATTYS.

United States Patent Office 2,816,973
Patented Dec. 17, 1957

2,816,973

FLOAT OPERATED SWITCH

Otto Beck, Jamaica, and Bruce W. Hackstaff, Huntington, N. Y., assignors to The F. & M. Schaefer Brewing Co., Brooklyn, N. Y.

Application April 1, 1954, Serial No. 420,263

12 Claims. (Cl. 200—84)

The invention relates to a float operated switch constructed of non-corrosive metal or plastic material particularly adapted for fermentation and food processing operations wherein precautions are observed to prevent the contamination of a liquid food stuff or biological product.

The float operated switch of simple construction and embodying a circuit maker and breaker in the well known liquid mercury switch, includes a float at one end of the device to position the liquid mercury for making and breaking the circuit which serves to actuate an alarm system or to automatically turn on or turn off a pump which maintains the delivery of the liquid in question to a predetermined horizontal level in a vat or other suitable container.

The use of float operated switches for the control of the liquid level in various types of fluid systems, such as oil delivery systems, electric water elevators, feed water boilers and the like is quite highly developed. However, none of the prior art devices have been found to be suitable for the problems which are peculiar to the food processing industries, particularly where it is desired to utilize an inexpensive portable device of rugged mechanical construction which can be readily inserted into a tank, vat or vessel in question and which can serve in the automatic control of the liquid feed under conditions wherein the requirements for hygienic operation and purity are of the highest.

A typical, although not limiting, example of the application of the present switch is found in the beer industry. As in most biological fermentations, the fermenting liquors are processed under rigorously controlled hygienic conditions and the introduction of impurities through the corrosion of the equipment or through the use of slightly sub-standard fermentation materials is rigorously controlled. Stainless steel or copper have been used for the material of the switch and the switch holder, but the prior art switches have been found to be too fragile in construction and too undependable in continued operation to permit their use in the portable manner as above described. A switch which will permit flexible adaptation to varying tank size, which will provide an accurate control of the order of a fraction of a percent of total volume in 10,000, 20,000 and 30,000 gallon tanks, which will be easily adjustable and serve under the varying conditions of top scum formation which are normally encountered in fermentation operations without detracting from the accuracy and safety of the controlled operation has not been at hand heretofore. The present device by virtue of its simplified construction and its particularly defined yoke balancing feature has solved the problem in a very effective manner under the extraordinarily varied conditions of usage without a single failure in contrast to the difficulties which were encountered with the devices of the prior art.

A further difficulty which has been encountered in attempting to use the prior art devices in brewery tank operations is the fact that the portable float switch is hung on the tank at a stage in the tank filling operation where the liquid level is far below the float and upon reaching the float the liquid frequently locks or jams the float and float arm against the portable tank support so that the buoying action of the liquid is completely lost and an overflow of the liquid results. Although this problem has been solved by the use of various kinds of spring tensioning devices to maintain the float in extended position, these devices have not been satisfactory since the springs tend to corrode or are easily bent, deformed or broken to require frequent adjustment and replacement. These difficulties are obviated in the present invention by providing an angled arm stop integral with the switch and ball support rod and extending to a distance which is shorter than the distance from the point of attachment of the rod to the point of pivotal engagement of the rod in a sleeve and pin adjustment in the portable tank support. The difficulty had with top scum to give false flotation readings or control has been quite effectively obviated in accordance with the invention by utilizing the portable tank support as the gasifying holder for the carbon dioxide gasification or for aerating agitation which is commonly used in the fermentation process. The gas line dipping into the liquid at a point which is much lower than the lowest position of the float which is permitted by the angled arm stop effectively disperses the top scum away from the float to prevent the float from falsely hanging and thereby cause the filling operation to be short.

An object of the present invention is to provide an easily dismantlable float operated switch comprising a mercury switch encased in a corrosion-resistant, fluid-tight, metal housing fitted with an adjustable end mounting for the rubber encased leads to the switch, said switch housing mounted on a switch support rod in substantially parallel relation to said rod, a ball float at the end of said rod, an end sleeve integral with and transverse to said support rod for the pivotal movement of said rod float and switch about the horizontal axis of said sleeve, a portable tank support provided with vertical adjusting holes in the flanged edges of said support, a pin for insertion in said transverse end sleeve and said holes to adjust the vertical position of the ball and switch with respect to the predetermined liquid level in a tank and an angled arm stop integral with the switch and ball support rod which extends to a distance which is substantially less than the distance from its point of attachment to the rod to the transverse end sleeve of the rod, said angled arm stop preventing the downward swinging movement of the ball below a predetermined level to insure a positive floating action in the buoying of the float by the liquid in the tank.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

In connection with that more detailed description, there is shown in the drawings, in Figure 1, a view partly in section and partly in perspective illustrating the float action of the switch in accordance with the invention and which includes a circuit diagram for the alarm and to control the pump.

Figure 2, a view partly in section and partly in perspective illustrating the switch, horizontal adjustment means and gasifying collar of the embodiment according to the present invention.

Figure 3, a detail of the circuit diagram shown in Figure 1.

Figure 4, a view partly in section and partly in plan of a modification of the horizontal adjustment means in accordance with the invention.

The operation of the float operated switch of the present invention is illustrated in Fig. 1 with reference to the control of the level of the fermentation beer in a brewery. The float operated switch device comprises a conventional mercury switch 2 mounted in a corrosion-resistant, fluid-tight metal housing 25, the leads to the switch connected to an electrical circuit for energizing an alarm A, or for turning on or shutting off a pump P which delivers the fermentation beer to the tank 30, the switch housing 25 being mounted upon a switch support rod 5 in substantially parallel relation to said rod 5 by brazing a fillet along the length of the tubular housing 25 to attach the housing in the same longitudinal direction as the rod 5, the end of the rod 5 being attached to a ball float 1 and the other end of the rod pivotally engaging an adjustable and portable tank support 4.

The tank support 4 is formed of a channel section and angled at its upper end at substantially right angles to permit the upper end to hook over the top edge of the tank 30. The flanges of the channel section as shown in Fig. 2 are provided with a series of longitudinally aligned holes 8, 8 which serve to adjust the vertical position of the ball and switch with respect to the predetermined liquid level in the tank. The end of the switch support rod 5 opposite to its point of attachment to the ball float 1 is provided with a transverse sleeve 11 into which is placed the adjusting pin 9, the adjusting pin 9 having a fitted cotter pin 10 at its ends so that the cotter pin will prevent the lateral displacement of adjusting pin 9 when the sleeve 11, pin 9 and cotter pin 10 are assembled in the vertical adjusting holes 8, 8 in the tank support.

As is evident in Figs. 2 and 4, the plurality of adjusting holes 8, 8 disposed along the flanges of the channel support 4 permit any predetermined setting of the float and switch to be made.

The top of the channel support 4 is fitted with a collar 7 as is shown in Fig. 2. The collar is split and is particularly adapted to receive and support a gasifying pipe 27 which is used for introducing carbon dioxide into the fermentation beer. This gasifying pipe 27 is also commonly employed in fermentation operations generally, for the purpose of agitating the fermentation medium whether by the means of air for the aerobic fermentations or using an inert oxygen free gas for anaerobic fermentations. Whether the purpose of gasification is agitation or supplementing the carbon dioxide content of the fermentation liquor, the use of the gas at the vicinity of the ball float switch provides for a greater security of liquid level control because top scum generally encountered at the top of the fermenting liquid is effectively dispersed away from the ball float and false readings due to the hanging of the ball float are substantially eliminated.

The mercury switch construction is substantially as shown in U. S. Patent 1,875,510 and in U. S. Patent 1,809,642. The level of the mercury varies directly in accordance with the position of the ball float 1 which is buoyed exclusively by the floating action of the liquid, precautions being taken to disperse the top scum as noted above. When the level of the liquid drops below the level of the ball 1 as shown in dotted section in Fig. 1, the rod 5 drops and the ball can hang vertically from the rod and pin 9 so that the rod 5 touches the inner surface of the channel of the tank support 4. In this condition, the rising liquid in the tank quite often jams the ball and rod against the inner surface of the channel and the floating of the ball is completely prevented. Without control in this condition, the tank overflows. This is prevented in accordance with the present invention by attaching an angled arm stop 6 to the ball support rod 5, said angled arm stop extending to a distance which is shorter than the distance from the point of attachment of the rod to the point of pivotal engagement of the rod 5 at sleeve 11. In its simplest and preferred form, the angled arm stop is a rod which forms a Y with the switch and ball support rod 5 and which extends below the sleeve 11 and pin 9 in the assembled form of the device.

A modification of the horizontal adjusting means of the portable tank support is shown in Fig. 4. Instead of using holes 8, 8 for the engagement of the pin 9 in the sleeve portion 11 of the device, it is sufficient to utilize upwardly opening slots 12 which are circularly cut at the lower portion to provide a stable connection for the pin 9 which secures the sleeve portion 11 of the rod 5.

In Figs. 1 and 3, the circuits are shown for energizing the alarm A and/or pump P. These circuits are of the type usually employed and have been illustrated only to show a simple means by which the tank filling operation can be controlled automatically and at the same time giving an alarm to alert the workman to the fact that a particular operation has been finished. As shown in Fig. 1, the alarm and pump are both included in the circuit, are connected in conventional manner in parallel and are provided with a switch 17 which is energized through the action of the floating mercury 20 contacting a mercury switch electrode, through leads 18 and 19.

A modification is shown in Fig. 3 wherein a solenoid 16 serves to close switch 17 when the float assumes the horizontal position and tilts the mercury switch to bring the liquid mercury 20 into contact with the mercury switch electrodes 13 and 14. The energy source is a battery shown in Fig. 3 and serves to energize the alarm A to give proper warning. The parallel wire lead 18 in Fig. 3 may be modified as in Fig. 1 to incorporate both the alarm and pump. As is known, suitable means may be provided to turn off the pump at the same time as the alarm is given and, if desired, a record may be made by using conventional recording equipment.

The switch housing 25 is preferably fabricated of copper or stainless steel. For ease of assembly or disassembly, it is provided with a plug at one end which is brazed or threadedly secured to the main body of the housing by a collar and the other end of the housing 25 is provided with a switch terminal sleeve 23 and an adjustable nut and bolt coupling 24 which serves to maintain a hermetic seal for the rubber covered lead wires 13 and 14. The lead wires 13 and 14 are of the conventional type and the covering 3 is preferably neoprene, an inert material which is stable under varying temperature conditions and which does not tend to contaminate the fermentation medium.

For ease of cleaning and to improve the ruggedness of the design, the same metal is used for all of the housing parts of the switch and for the rod and ball parts. Copper has been found to be very satisfactory for this purpose. The switch housing mount 22 is a brazed copper fillet.

No failures have ever been observed in the use of the device despite rough handling. Electrical failures have been observed in the prior art devices due to the fraying of the covered conductor 3 at the mechanical connection of the conductor to the mercury switch housing 25, such fraying exposing the bare wire leads and causing short circuits upon immersion in the liquid 26. The operator's hands may be wet and there is a great danger of shock due to such frayed connection. The use of the adjustable nut and bolt coupling 24 which threadedly secures and hermetically seals the electrode end of the mercury switch housing 25 effectively guards against any fraying of the covered conductor 3. The nut portion is provided with a suitable internal circular gasket of neoprene to insure the maintenance of a good mechanical and hermetic seal. This is of greater importance when the electrical energy source 15 is 110–120 line voltage, A. C. through a rectifier or direct D. C.

The simplicity of the all brazed copper or of welded stainless steel construction is realized through the use of welding or pressing connections, such as the brazing sleeve 21 or connecting the ball float 1 to the support rod 5 and by the use of the switch terminal sleeve 23 which provides for a good mechanical connection of the electrode leads to the switch 2.

The gasifying pipe 27 serves an additional useful function when the float 1 is in the downward position shown in Fig. 1 by directing the stream of the gas through outlet 28 to push the ball 1 into position where it is properly buoyed up by the rising liquid 26 in the tank 30.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What is claimed is:

1. In a float operated mercury switch adapted to provide an alarm signal and to control a pump which delivers liquid to a tank, a corrosion-resistant, fluid-tight, metal housing for said switch and the rubber leads to the switch, a switch support rod attached at one end to a ball float and provided with a transverse end sleeve at its other end for pivotal movement about the horizontal axis of said sleeve, a portable channel tank support provided with vertical adjusting holes in the flanged edges of the channel, the switch housing mounted on said switch support rod in substantially parallel relation thereto, a pin for insertion in said sleeve and in the holes in said support to adjust the vertical position of the ball and switch with respect to the level of the liquid in the tank and an angled arm stop connected to said switch support rod forming a Y with said switch support rod extending below said sleeve and pin in assembled relation to a distance substantially less than the distance from its point of attachment to the rod to the end sleeve of the rod.

2. In a float operated mercury switch adapted to provide an alarm signal and to control a pump which delivers liquid to a tank, a corrosion-resistant, fluid-tight, metal housing for said switch and the rubber leads to the switch, a switch support rod attached at one end to a ball float and provided with a transverse end sleeve at its other end for pivotal movement about the horizontal axis of said sleeve, a portable channel tank support provided with vertical adjusting holes in the flanged edges of the channel, said channel tank support bent at substantially right angles at its upper portion to form a hook which extends over the top edge of the tank, the switch housing mounted on said switch support rod in substantially parallel relation thereto, a pin for insertion in said sleeve and in the holes in said support to adjust the vertical position of the ball and switch with respect to the level of the liquid in the tank and an angled arm stop connected to said switch support rod forming a Y with said switch support rod extending below said sleeve and pin in assembled relation to a distance substantially less than the distance from its point of attachment to the rod to the end sleeve of the rod.

3. In a float operated mercury switch adapted to provide an alarm signal and to control a pump which delivers liquid to a tank, a corrosion-resistant, fluid-tight, metal housing for said switch and the rubber leads to the switch, a switch support rod attached at one end to a ball float and provided with a transverse end sleeve at its other end for pivotal movement about the horizontal axis of said sleeve, a portable channel tank support provided with vertical adjusting holes in the flanged edges of the channel, said channel tank support bent at substantially right angles at its upper portion to form a hook which extends over the top edge of the tank, a collar adapted to engage a gasifying pipe for the delivery of a fluid below the liquid level of the tank to agitate the liquid in the vicinity of the float and to insure positive floating action in the buoying of the float by the liquid in the tank, the switch housing mounted on said switch support rod in substantially parallel relation thereto, a pin for insertion in said sleeve and in the holes in said support to adjust the vertical position of the ball and switch with respect to the level of the liquid in the tank and an angled arm stop connected to said switch support rod forming a Y with said switch support rod extending below said sleeve and pin in assembled relation to a distance substantially less than the distance from its point of attachment to the rod to the end sleeve of the rod.

4. In combination, a gasifying pipe and a float operated switch to provide an alarm signal and to control a pump which delivers liquid to a tank, a corrosion-resistant, fluid-tight, metal housing for said switch and the rubber leads to the switch, a switch support rod attached at one end to a ball float and provided with a transverse end sleeve at its other end for pivotal movement about the horizontal axis of said sleeve, a portable channel tank support provided with vertical adjusting holes in the flanged edges of the channel, said channel tank support bent at substantially right angles at its upper portion to form a hook which extends over the top edge of the tank, a collar adapted to engage a gasifying pipe for the delivery of a fluid below the liquid level of the tank to agitate the liquid in the vicinity of the float and to insure positive floating action in the bouying of the float by the liquid in the tank, the switch housing mounted on said switch support rod in substantially parallel relation thereto, a pin for insertion in said sleeve and in the holes in said support to adjust the vertical position of the ball and switch with respect to the level of the liquid in the tank and an angled arm stop connected to said switch support rod forming a Y with said switch support rod extending below said sleeve and pin in assembled relation to a distance substantially less than the distance from its point of attachment to the rod to the end sleeve of the rod.

5. A switch construction and support as in claim 1, wherein said holes in said portable channel tank support are formed as upwardly opening slots which are circularly cut out at the lower portion thereof to provide a stable connection for the pin which secures the sleeve of the rod to the tank support.

6. A switch construction and support as in claim 2, wherein said holes in said portable channel tank support are formed as upwardly opening slots which are circularly cut out at the lower portion thereof to provide a stable connection for the pin which secures the sleeve of the rod to the tank support.

7. A switch construction and support as in claim 3, wherein said holes in said portable channel tank support are formed as upwardly opening slots which are circularly cut out at the lower portion thereof to provide a stable connection for the pin which secures the sleeve of the rod to the tank support.

8. A switch construction and support as in claim 4, wherein said holes in said portable channel tank support are formed as upwardly opening slots which are circularly cut out at the lower portion thereof to provide a stable connection for the pin which secures the sleeve of the rod to the tank support.

9. In a float operated mercury switch adapted to provide an alarm signal and to control a pump which delivers liquid to a tank, a corrosion-resistant, fluid-tight, metal housing for said switch and the rubber leads to the switch, said metal housing provided with a dismantlable plug at one end and an adjustable nut and bolt coupling at the other end for maintaining a hermetic seal between the rubber covered leads to the switch and the housing, a switch support rod attached at one end to a ball float and provided with a transverse end sleeve at its other end for pivotal movement about the horizontal axis of said sleeve, a portable channel tank support provided with vertical adjusting holes in the flanged edges of the channel, the switch housing mounted on said switch support rod in substantially parallel relation thereto, a pin for insertion in said sleeve and in the holes in said support to adjust the vertical position of the ball and switch with respect to the level of the liquid in the tank and an angled arm stop connected to said switch support rod forming a Y with said switch support rod extending below said sleeve and pin in assembled relation to a distance substantially less than the distance from its point of attachment to the rod to the end sleeve of the rod.

10. A portable switch mechanism for controlling the level of a liquid in a tank comprising a mercury switch, a housing for said switch, a support rod for said housing upon which said housing is mounted in substantially parallel relation thereto, a fall float connected to said support rod at one end thereof, a transverse sleeve upon said support rod at the other end thereof, a portable tank support upon which said sleeve is pivotally mounted, means for vertically adjusting said sleeve upon said portable tank support, stop means mounted upon said support rod for cooperation with said tank support to limit pivotal movement of said ball float and support rod in one direction, and said means for vertically adjusting said sleeve comprises upwardly directed slots upon said tank support.

11. A portable switch mechanism for controlling the level of a liquid in a tank comprising a mercury switch, a housing for said switch, a support rod for said housing upon which said housing is mounted in substantially parallel relation thereto, a fall float connected to said support rod at one end thereof, a transverse sleeve upon said support rod at the other end thereof, a portable tank support upon which said sleeve is pivotally mounted, means for vertically adjusting said sleeve upon said portable tank support, stop means mounted upon said support rod for cooperation with said tank support to limit pivotal movement of said ball float and support rod in one direction, said portable tank support being of channel construction and said stop means cooperate with the web of said channel.

12. A portable switch mechanism for controlling the level of a liquid in a tank comprising a mercury switch, a housing for said switch, a support rod for said housing upon which said housing is mounted in substantially parallel relation thereto, a fall float connected to said support rod at one end thereof, a transverse sleeve upon said support rod at the other end thereof, a portable tank support upon which said sleeve is pivotally mounted, means for vertically adjusting said sleeve upon said portable tank support, stop means mounted upon said support rod for cooperation with said tank support to limit pivotal movement of said ball float and support rod in one direction, said tank support being provided with a hook-shaped portion to cooperate with the edge of a tank and a collar secured to said tank support to engage a pipe for the delivery of a fluid below the liquid level in the tank to agitate the liquid in the tank in the vicinity of said float in order to remove any scum formation at such point.

References Cited in the file of this patent

UNITED STATES PATENTS

| Re. 20,380 | Hickstein et al. | May 25, 1937 |
|---|---|---|
| 594,403 | Johnson | Nov. 30, 1897 |
| 660,119 | McGurty | Oct. 23, 1900 |
| 744,817 | Sundh | Nov. 24, 1903 |
| 997,230 | Bendt | July 4, 1911 |
| 1,146,599 | Sharp | July 13, 1915 |
| 1,297,938 | Varner | Mar. 18, 1919 |
| 1,922,362 | Halversen | Aug. 15, 1933 |
| 1,962,125 | Burkle | June 12, 1934 |
| 2,270,784 | Miller et al. | Jan. 20, 1942 |

FOREIGN PATENTS

| 68,570 | Switzerland | June 7, 1914 |